United States Patent
Xing et al.

(10) Patent No.: US 9,878,959 B2
(45) Date of Patent: Jan. 30, 2018

(54) PROCESS AND APPARATUS FOR COATING A CONTROLLED RELEASE PRODUCT IN A ROTATING DRUM

(71) Applicant: Agrium Inc., Calgary (CA)

(72) Inventors: Boazhong Xing, Calgary (CA); Lawrence A. Wilms, Strathmore (CA); Nick P. Wynnyk, Edmonton (CA); Robert G. Ford, Carseland (CA); Nicolette M. Babiak, Gibbons (CA); J. David Eastham, Okotoks (CA)

(73) Assignee: Agrium Inc., Calgary (CA)

( * ) Notice: Subject to any disclaimer, the term of this patent is extended or adjusted under 35 U.S.C. 154(b) by 228 days.

(21) Appl. No.: 14/850,666

(22) Filed: Sep. 10, 2015

(65) Prior Publication Data

US 2015/0376078 A1    Dec. 31, 2015

Related U.S. Application Data

(63) Continuation of application No. 12/756,835, filed on Apr. 8, 2010, now abandoned, which is a continuation of application No. 11/292,048, filed on Nov. 30, 2005, now abandoned.

(60) Provisional application No. 60/631,409, filed on Nov. 30, 2004.

(51) Int. Cl.
*C05G 3/00* (2006.01)
*B01J 2/00* (2006.01)
*B01J 2/12* (2006.01)
*C05C 9/00* (2006.01)
*B05B 13/02* (2006.01)

(52) U.S. Cl.
CPC ............ *C05G 3/0029* (2013.01); *B01J 2/006* (2013.01); *B01J 2/12* (2013.01); *C05C 9/005* (2013.01); *B05B 13/0257* (2013.01)

(58) Field of Classification Search
CPC .................................. C05G 3/0029; B01J 2/12
See application file for complete search history.

(56) References Cited

U.S. PATENT DOCUMENTS

| | | | |
|---|---|---|---|
| 2,576,952 A | 12/1951 | Lowe et al. | |
| 3,285,223 A | 11/1966 | Sahlin | |
| 3,754,559 A * | 8/1973 | Seiwert | B08B 3/042 134/104.1 |
| 3,903,333 A | 9/1975 | Shirley, Jr. et al. | |

(Continued)

FOREIGN PATENT DOCUMENTS

| | | |
|---|---|---|
| CA | 1171326 A1 | 7/1984 |
| CA | 2402212 C | 9/2002 |

(Continued)

OTHER PUBLICATIONS

International Search Report and Written Opinion issued in PCT/CA2005/000906, dated Nov. 8, 2005, 8 pages.

(Continued)

Primary Examiner — Robert A Vetere
(74) Attorney, Agent, or Firm — Faegre Baker Daniels LLP

(57) ABSTRACT

The present invention is directed to a process for coating a substrate in a rotating drum, wherein a pocket is created in a substrate bed into which pocket coating materials are delivered. Also provided is a controlled release product produced according to this process, and an apparatus for carrying out the process.

18 Claims, 4 Drawing Sheets

(56) References Cited

U.S. PATENT DOCUMENTS

| | | |
|---|---|---|
| 3,915,120 A | 10/1975 | Terry |
| 3,916,825 A * | 11/1975 | Schnitzler ............ B27N 1/0245 118/303 |
| 3,953,192 A | 4/1976 | Hodgson et al. |
| 3,991,225 A | 11/1976 | Blouin |
| 4,023,955 A | 5/1977 | Mueller |
| 4,042,366 A | 8/1977 | Fersch et al. |
| 4,142,885 A | 3/1979 | Heumann et al. |
| 4,150,965 A | 4/1979 | Van Hijfte et al. |
| 4,220,463 A | 9/1980 | Van Hijfte et al. |
| 4,241,692 A | 12/1980 | Van Hijfte et al. |
| 4,363,285 A | 12/1982 | Yoshida et al. |
| 4,430,003 A | 2/1984 | Beattie et al. |
| 4,444,810 A | 4/1984 | Huttlin |
| 4,465,017 A | 8/1984 | Simmons |
| 4,572,845 A | 2/1986 | Christen |
| 4,711,659 A | 12/1987 | Moore |
| 4,725,446 A | 2/1988 | Forster et al. |
| 4,804,403 A | 2/1989 | Moore |
| 4,857,098 A | 8/1989 | Shirley, Jr. |
| 4,857,359 A | 8/1989 | Groher et al. |
| 4,919,739 A | 4/1990 | Dyksterhouse et al. |
| 4,969,947 A | 11/1990 | Moore |
| 5,089,041 A | 2/1992 | Thompson et al. |
| 5,186,732 A | 2/1993 | Thompson et al. |
| 5,188,654 A | 2/1993 | Manalastas et al. |
| 5,219,465 A | 6/1993 | Goertz et al. |
| 5,238,480 A | 8/1993 | Rehberg et al. |
| 5,256,181 A | 10/1993 | Manalastas et al. |
| 5,300,135 A | 4/1994 | Hudson et al. |
| 5,374,292 A | 12/1994 | Detrick et al. |
| 5,405,426 A | 4/1995 | Timmons et al. |
| 5,435,821 A | 7/1995 | Duvdevani et al. |
| 5,466,274 A | 11/1995 | Hudson et al. |
| 5,478,375 A | 12/1995 | Hudson |
| 5,501,874 A | 3/1996 | Yamamoto et al. |
| 5,538,531 A | 7/1996 | Hudson et al. |
| 5,547,486 A | 8/1996 | Detrick et al. |
| 5,563,782 A | 10/1996 | Chen et al. |
| 5,601,873 A | 2/1997 | Nakazawa et al. |
| 5,622,561 A | 4/1997 | Cummins et al. |
| 5,637,349 A | 6/1997 | Cummins et al. |
| 5,653,782 A | 8/1997 | Stern et al. |
| 5,698,002 A | 12/1997 | Hudson |
| 5,803,946 A | 9/1998 | Petcavich et al. |
| 5,851,261 A | 12/1998 | Markusch et al. |
| 5,858,094 A | 1/1999 | Detrick et al. |
| 5,917,110 A | 6/1999 | Kust |
| 5,984,994 A | 11/1999 | Hudson |
| 5,997,601 A | 12/1999 | Kust |
| 6,001,147 A | 12/1999 | Markusch et al. |
| 6,152,981 A | 11/2000 | Markusch et al. |
| 6,165,550 A | 12/2000 | Markusch et al. |
| 6,176,891 B1 | 1/2001 | Komoriya et al. |
| 6,231,633 B1 | 5/2001 | Hirano et al. |
| 6,315,807 B1 | 11/2001 | Patra et al. |
| 6,322,606 B1 | 11/2001 | Komoriya et al. |
| 6,336,949 B1 | 1/2002 | Patra et al. |
| 6,338,746 B1 | 1/2002 | Detrick et al. |
| 6,355,083 B1 | 3/2002 | Ogzewalla |
| 6,358,295 B1 | 3/2002 | Tabei et al. |
| 6,358,296 B1 | 3/2002 | Markusch et al. |
| 6,361,720 B1 | 3/2002 | Highsmith |
| 6,364,925 B1 | 4/2002 | Markusch et al. |
| 6,391,454 B1 | 5/2002 | Mao et al. |
| 6,436,164 B1 | 8/2002 | Highsmith |
| 6,475,259 B1 | 11/2002 | Thomas et al. |
| 6,503,288 B1 | 1/2003 | Markusch |
| 6,537,611 B1 | 3/2003 | Detrick et al. |
| 6,663,686 B1 | 12/2003 | Geiger et al. |
| 6,787,234 B2 | 9/2004 | Tijsma et al. |
| 7,682,656 B2 | 3/2010 | Xing et al. |
| 7,722,696 B2 | 5/2010 | Winter et al. |
| 8,178,161 B2 | 5/2012 | Xing et al. |
| 2002/0056948 A1 | 5/2002 | Highsmith |
| 2003/0033843 A1 | 2/2003 | Tabei |
| 2003/0051523 A1 | 3/2003 | Tabei |
| 2003/0089150 A1 | 5/2003 | Markusch et al. |
| 2003/0215657 A1* | 11/2003 | Tijsma ............... C05F 11/08 428/484.1 |
| 2004/0016276 A1 | 1/2004 | Wynnyk et al. |
| 2004/0020254 A1 | 2/2004 | Wynnyk et al. |
| 2004/0045331 A1 | 3/2004 | Geiger et al. |
| 2005/0076687 A1* | 4/2005 | Whittington ......... C05G 3/0058 71/64.07 |
| 2005/0276905 A1 | 12/2005 | Xing et al. |
| 2006/0115586 A1 | 6/2006 | Xing et al. |
| 2010/0186470 A1 | 7/2010 | Xing et al. |
| 2010/0233332 A1 | 9/2010 | Xing et al. |

FOREIGN PATENT DOCUMENTS

| | | |
|---|---|---|
| EP | 0609444 B1 | 4/1998 |
| GB | 1453258 B1 | 10/1976 |
| GB | 1482213 B1 | 8/1997 |
| JP | 08183828 A | 7/1996 |
| WO | WO2003048075 A1 | 6/2003 |

OTHER PUBLICATIONS

International Search Report and Written Opinion issued in PCT/CA2005/001814, dated Mar. 14, 2006, 7 pages.

Wall, Larry L. and Gehrke, Charles W. Automated Determination of Urea and Ammoniacal Nitrogen (NPN) in Animal Feeds (Missouri, University of Missouri: 1980).

\* cited by examiner

US 9,878,959 B2

PROCESS AND APPARATUS FOR COATING A CONTROLLED RELEASE PRODUCT IN A ROTATING DRUM

CROSS-REFERENCE TO RELATED APPLICATION

This application is a continuation of U.S. patent application Ser. No. 12/756,835, filed Apr. 8, 2010, now abandoned which is a continuation of U.S. patent application Ser. No. 11/292,048, filed Nov. 30, 2005, now abandoned and which claims priority to U.S. Provisional Application No. 60/631,409, filed Nov. 30, 2004, each of which is commonly owned and is incorporated herein in its entirety by reference.

TECHNICAL FIELD

This invention relates to an improved process and apparatus for coating a substrate in a rotating drum.

BACKGROUND

Typically fertilizer granules are coated in a rotating drum by spraying and/or dribbling coating components onto the top surface of the bed of fertilizer granules. In this method, the coating materials, such as castor oil and isocyanate, do not easily penetrate into the granule bed. One of the reasons for this is their high viscosity and surface tension, which inhibits penetration into the granule bed. Because these coating materials do not readily penetrate into the bed, they first coat the drum surface, and are subsequently transferred onto the surface of the fertilizer granules. In this two stage process, the coating materials cannot spread effectively on the surface of the fertilizer granules within the time it takes for the castor oil and isocyanate to react to form polyurethane (approximately four minutes at 75° C.). A similar problem exists when other coating materials, such as other thermoplastic polymers or thermoset polymers, are used. Accordingly, cured or dried coating material builds up on the drum surface. This coating build up on the drum surface is called "fouling".

In prior art processes, fouling is severe, especially on the drum surface around the coating material nozzles. In many cases, the coating drum must be cleaned every two weeks. Not only is the cleaning process expensive, but the production interruptions and higher raw material consumption negatively affects net profits. Moreover, fouling adversely affects the quality of the controlled release product.

Coating quality (and therefore product performance) is reduced in prior art processes since there is limited opportunity for coating materials to mix in the stoichiometric ratios necessary to form the desired optimum coat on substrate granules. For instance, isocyanate is typically dribbled onto the surface of the granules in a narrow line, while castor oil is either dribbled or sprayed. In either case, the opportunity for mixing of these two components with each other and on the surface of the granules is limited, even if the isocyanate and castor oil are delivered substantially simultaneously. One reason for this is that granules moving in a rotating drum exhibit a linear layer flow, with slow lateral mixing between layers.

Attempts have been made to improve the coating process in a rotating drum. One approach has been to dip injector nozzles into the fertilizer bed so coating components are injected into the fertilizer bed immediately below the surface of the bed. (See, for example, U.S. Pat. No. 5,374,292; U.S. Pat. No. 5,547,486; U.S. Pat. No. 5,858,094; and U.S. Pat. No. 6,537,611.) However, there still remains a need in the art to further improve mixing and reduce fouling to increase the efficiency of the coating process.

SUMMARY

Example 1 is a process for coating fertilizer granules in a rotating drum. The process includes rotating a drum containing fertilizer granules to form a granular bed having a first portion and a second portion, moving at least a portion of the second portion of the granular bed relative to a plow, forming a polyurethane coating on the fertilizer granules by separately delivering a first coating material and a second coating material into the second portion of the granular bed, and flowing the coated fertilizer granules over a plurality of baffles oriented in a direction opposite the rotational direction of the rotating drum. The first portion is proximate the drum wall and moving in the same rotational direction as the drum. The second portion is distal the drum wall and moving in a direction opposite that of the rotational direction of the drum to form a surface of the granular bed. The plow is inserted into the second portion of the granular bed to form a pocket on a side of the plow and below the surface of the granular bed. At least one of the first coating material and the second coating material are delivered directly into the pocket.

In Example 2, the process according to Example 1, wherein the at least one of the first coating material and the second coating material are delivered by spraying directly into the pocket.

In Example 3, the process according to Example 1, wherein the at least one of the first coating material and the second coating material are delivered by dribbling directly into the pocket.

In Example 4, the process according to any of Examples 1-3, wherein the first coating material includes a polyol and the second coating material includes an isocyanate.

In Example 5, the process according to Example 4, wherein the polyol is castor oil.

In Example 6, the process according to any of Examples 1-5, wherein the first coating material and the second coating material are delivered directly into the pocket.

In Example 7, the process according to Example 6, wherein the first coating material and the second coating material are both delivered directly into the pocket by separate injection nozzles.

In Example 8, the process according to any of Examples 7, wherein the plow includes a scoop and the pocket is formed on a side of the scoop downstream relative to the movement of the second portion of the granular bed.

In Example 9, the process according to Example 8, wherein the plow further includes a linear arm and the scoop is formed by a curvature of the linear arm at an end of the plow.

Example 10 is a process for coating fertilizer granules in a rotating drum. The process includes rotating a drum containing fertilizer granules to form a granular bed having a first portion and a second portion, moving at least a portion of the second portion of the granular bed relative to a plow inserted into the second portion of the granular bed to form a pocket below the surface of the granular bed on a side of the plow downstream relative to the movement of the second portion of the granular bed, and forming a polyurethane coating on the fertilizer granules by separately delivering a first coating material and a second coating material directly into the pocket. The first portion is proximate the drum wall and moving at least partially in the same rotational direction as the drum. The second portion distal the drum wall and moving a least partially in a direction opposite that of the rotational direction of the drum to form a surface of the granular bed.

In Example 11, the process according to Example 10, wherein the at least one of the first coating material and the second coating material are delivered by spraying directly into the pocket.

In Example 12, the process according to Example 10, wherein at least one of the first coating material and the second coating material are delivered by dribbling directly into the pocket.

In Example 13, the process according to any of Examples 10-12, wherein the first coating material includes a polyol and the second coating material includes an isocyanate.

In Example 14, the process according to Example 13, wherein the polyol is castor oil.

In Example 15, the process according to any of Examples 10-14, further including flowing the coated fertilizer granules over a plurality of baffles oriented in a direction opposite the rotational direction of the rotating drum.

In Example 16, the process according to any of Examples 10-15, wherein the first coating material and the second coating material are delivered directly into the pocket by different injection nozzles.

In Example 17, the process according to any of Examples 10-16, wherein the plow includes a scoop.

In Example 18, the process according to Example 17, wherein the plow further includes a linear arm and the scoop is formed by a curvature of the linear arm at an end of the plow.

DETAILED DESCRIPTION

Figure 1:
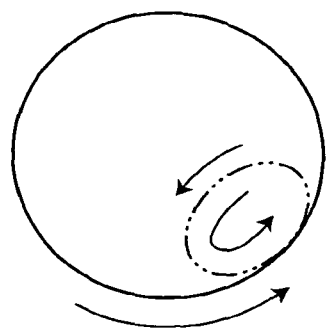
FIG. 1 illustrates linear layer flow of substrate granules in a rotating drum.

It has surprisingly been found that in a method for coating fertilizer granules in a rotating drum, there is significant reduction in fouling where a means is used to create a hole or pocket in the fertilizer granule bed, with the coating materials being delivered into the hole or pocket created. The means for creating the hole or pocket is not particularly limited, and includes a mechanical device, such as a plow, or high pressure air. Where a mechanical device, such as a plow, is used to create the hole or pocket in the fertilizer bed, it was further surprisingly found that substantially improved results are obtained when the coating materials are introduced behind the plow in the applications of coating materials to fertilizer.

The improved method of the invention not only reduces fouling, but there is also improved mixing of the fertilizer granules with coating materials. An improved controlled release profile is observed, suggesting that coating materials are more uniformly distributed onto the granules because of improved mixing. Improved mixing also reduces the time required to coat the fertilizer granules, resulting in shorter residence drum times and improved efficiency.

Although preferred substrates are fertilizer and plant nutrients, the process of the invention could be applied to a variety of other substrates. Other examples of substrates include drugs, vitamins, etc.—any substrate for which controlled release delivery would be beneficial, and which can be coated in a rotating drum.

If a fertilizer or plant nutrient material is coated, the fertilizer or plant nutrient material preferably comprises a water soluble compound. Preferably, the plant nutrient comprises a compound containing nitrogen, phosphorus, potassium, sulphur, micronutrients, or a mixture thereof. A preferred plant nutrient comprises urea. Other examples of useful plant nutrients are ammonium sulphate, ammonium phosphate, diammonium phosphate and mixtures thereof. Examples of useful micronutrients include copper, zinc, boron, manganese, iron and mixtures thereof. Useful plant nutrient materials are also described in U.S. Pat. No. 5,538,531 and U.S. Pat. No. 6,358,296.

A variety of coatings may be used on the substrate. Preferably, a polymer coating is used, and more preferably a thermoset polymer. Examples of thermoset polymers include those derived from phenolic, aminoplastic or epoxy resins, some polyesters, polysulphides, and polyurethanes. The thermoset polymer is preferably derived from an epoxy resin. Yet more preferably, the thermoset polymer is a polyurethane or a substituted polyurethane.

In a preferred embodiment, the thermoset polymer is formed by reacting a polyol or a mixture of polyols and an isocyanate or a mixture of isocyanates. The polyol may be any hydroxy-terminated polyol, such as a polyether, polyester, polycarbonate, polydiene, polycaprolactone, or a mixture thereof. Preferred are polyols such as hydroxy-terminated polyhydrocarbons, hydroxy-terminated polyformals, fatty acid triglycerides, hydroxy-terminated polyesters, hydroxymethyl-terminated polyesters, hydroxymethyl-terminated perfluoromethylenes, polyalkylene-ether glycols, polyalkylene-arylene-ether glycols and polyalkylene-ether triols. Preferred polyols include polyethelene glycols, adipic acid-ethylene glycol polyesters, poly(butylene glycol), polypropylene glycol) and hydroxy-terminated polybutadiene (see, for example, British patent No. 1,482,213). More preferred are polyether polyols and most preferred are polyether polyols having a molecular weight in the range of from about 60 to about 20,000, more preferably from about 60 to about 10,000 and most preferably from about 60 to about 8,000.

Preferred polyols are also described in U.S. Pat. No. 5,538,531. In U.S. Pat. No. 5,538,531, polyols having from about 2 to about 6 hydroxy groups, and preferably having at least one $C_{10}$-$C_{22}$ aliphatic moiety, are described.

Most preferably, the polyol is castor oil or a mixture of castor oil with other polyols.

The polyol may also be derived from natural sources, such as soybean, corn, canola, and the like. Polyols derived from natural sources can be used as they are or can be used to derive a synthetic polyol, such as a synthetic polyol based on soybean oil, which is commercially available from Urethane Soy Systems Corp. (Princeton, Ill.).

Another useful class of polyols are oleo polyols, such as described in U.S. Pat. No. 6,358,296.

A mixture of polyols may also be used, for instance, castor oil with ethylene glycol, castor oil with oleo polyol, castor oil with polyethylene glycol, castor oil with polypropylene glycol, or a polypropylene (or polyethylene) glycol mixture of different end groups and molecular weight.

Any suitable isocyanate may also be used. Generally, the isocyanate compound suitable for use may be represented by the general formula:

$$Q(NCO)_j$$

wherein i is an integer of two or more and Q is an organic radical having a valence of i. Q may be a substituted or unsubstituted hydrocarbon group (e.g., an alkylene or arylene group). Moreover Q may be represented by the formula:

$$Q^1-Z-Q^1$$

wherein $Q^1$ is an alkylene or arylene group and Z is chosen from the group comprising —S—, —S-$Q^1$-S— and —SO$_2$—. Examples of isocyanate compounds which fall within the scope of this definition include hexamethylene diisocyanate, 1,8-diisocyanato-pnaphthalene, xylyl diisocyanate, (OCNCH$_2$CH$_2$CH$_2$OCH$_2$O) 2,1-mctbyl-2,4-diisocyanatocyclobexane, phenylene diisocyanates, tolylene diisocyauates, chlorophenylene diisocyanates, diphenylmetbaue-4,4'diisocyanate, naphthalene-1,5-diisocyanate, triphenylmethane-4,4'4"-triisocyanate and isopropylbenzene-alpha-4-diisocyanate.

In another embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as described above) with an active hydrogen-containing compound, preferably the polyols described above. In this embodiment, the polyisocyanate may be, for example, used in proportions of from about 30 percent to about 200 percent stoichiometric excess with respect to the proportion of hydroxyl in the polyol.

In another embodiment, the isocyanate compound suitable for use in the process of the present invention may be selected from dimers and trimers of isocyanates and diisocyanates, and from polymeric diisocyanates having the general formula:

$$[Q''(NCO)_i]_j$$

$$[Q''(NCO)_i]_j$$

wherein both i and j are integers having a value of 2 or more, and Q" is a polyfunctional organic radical. Such isocyanates may be used together with compounds having the general formula:

$$L(NCO)_k$$

$$L(NCO)_k$$

wherein k is an integer having a value of 1 or more and L is a monofunctional or polyfunctional atom or radical.

Examples of isocyanate compounds which fall within the scope of this definition include ethylphosphonic diisocyanate, phenylphosphonic diisocyanate, compounds which contain a =Si—NCO group, isocyanate compounds derived from sulphonamides (QSO$_2$NCO), cyanic acid and thiocyanic acid.

See also, for example, British patent No. 1,453,258 for other examples of useful isocyanate compounds.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polisocyanates and mixtures thereof.

Particularly preferred isocyanates are those described in U.S. Pat. No. 5,538,531 and U.S. Pat. No. 6,358,296.

An isocyanate mixture may be preferred for some coatings.

Preferably, the polyol and isocyanate are used in amounts such that the ratio of NCO groups in the isocyanate to hydroxy groups in the polyol is in the range from about 0.5 to about 3.0, more preferably from about 0.8 to about 2.0, and most preferably from about 0.9 to about 1.1.

In addition, a thermoset polymer may be formed by using amine group-terminated or mercaptan-terminated monomers. For instance a urea-formaldehyde resin may be used.

Additives may be included in the coating materials. For instance, if the coating materials are hydrophilic, then they will be compatible with hydrophilic substrate surfaces and they will be easy to spread on the surface. If the coating materials are hydrophobic however, there will be difficulty in spreading the coating materials on the substrate surface. Under these circumstances, additives like wetting agents, flow agents, levelling agents and coupling agents may be used to improve spreadability. If the viscosity of the coating is high, an additive may be also be used to improve spreadability.

Another function of additives is to increase the hydrophobicity of the coating. Hydrophobic additives reduce the release rate of coated substrate.

Preferred additives are organic additives, such as petroleum products, coal products, natural products and synthetic products. Lubricants derived from these may also be used. Exemplary organic additives include commercially available coating additives and paint additives (such as wetting agents, flow agents, levelling agents and coupling agents), wax, paraffin oil, bitumen, asphalt, oil derived from coal, canola oil, soybean oil, coconut oil, linseed oil, tung oil, vegetable wax, animal fat, animal wax, and forest products such as tall oil, modified tall oil, tall oil pitch, and pine tar. Mixtures of these materials may also be used. Particularly preferred organic additives are hydrophobic materials.

If the organic additive is wax, preferred waxes are those described in U.S. Pat. No. 5,538,531 or a silicone wax, such as is available from Dow Corning. Preferred waxes have a drop melting point of at least 10° C., preferably between about 20° C. to about 120° C., and more preferably between about 30° C. to about 120° C. Most preferably, the wax is substantially non-tacky below about 40° C. The preferred wax is a $C_{10}+$ alpha-olefin, and more preferably a $C_{20-100}$ alpha-olefin. Most preferably, the wax is a $C_{30}+$ wax, such as is available commercially from Chevron Phillips Chemical Company.

The amount of organic additive may vary, depending on its purpose in the mixture, as would be apparent to a person of skill in the art. For instance, for some commercially available additives, an amount as low as 0.001% by weight of the coating composition may be used.

Preferred organic additives and amounts are those that improve the release profile and mechanical handling of the polymer coated substrate.

In a drum, substrate granules exhibit a linear layer flow as shown in FIG. 1. The granules in contact with the drum wall and those proximate to the drum wall move in the direction of the drum due to friction forces between the granules and (a) the drum wall and (b) other proximate granules. However, due to these same friction forces between granules, the granules on the surface of the granule bed and distal to the drum wall move in an opposite linear direction to the linear direction of rotation of the drum. This effect results in a layered flow pattern, which inhibits penetration of coating components through the granule bed. It was found that by creating a hole or pocket in the granule bed, deeper penetration and a wider range of distribution of coating materials into the granule bed is achieved, and mixing is improved. Also it changes the flow pattern of the granules—i.e. breaks up the linear flow pattern.

Figure 2:
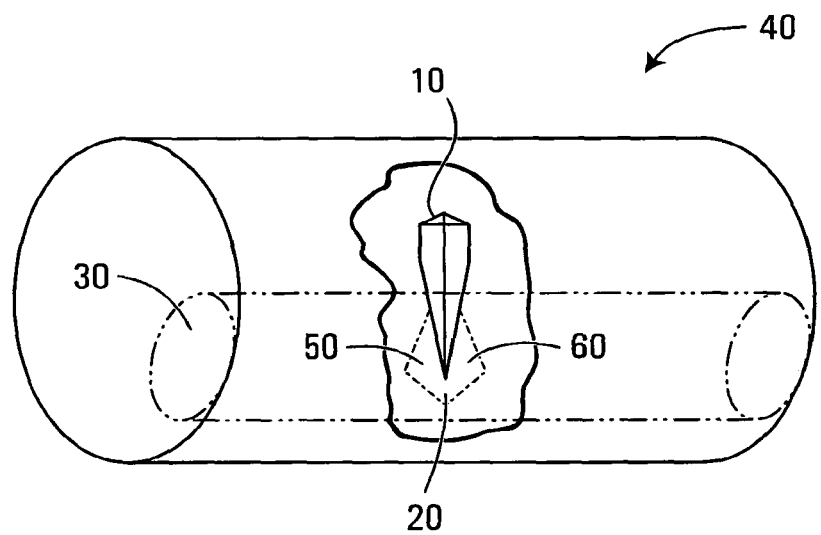
FIG. 2 shows the simultaneous delivery of polymer coating, premix and/or monomers into a hole or pocket in a granule bed created by a plow in a rotating drum according to an embodiment of the invention.
Figure 3:
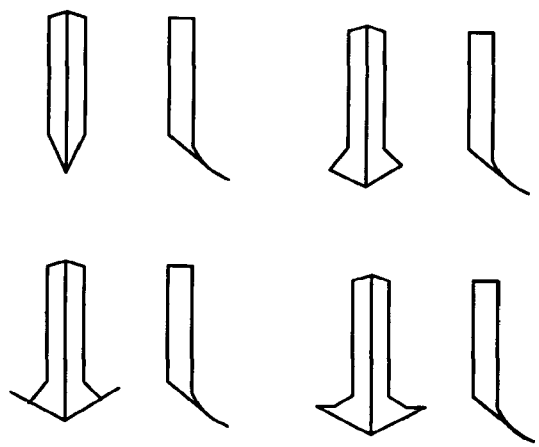
FIG. 3 shows a number of possible shapes for a plow for use in a process of the invention.

A variety of means can be used to create the hole or pocket in the granule bed. Preferably the hole or pocket is created by a mechanical device, such as a plow, or high pressure air. An example of a plow (10) creating a hole or pocket (20) in a substrate granule bed (30) in a rotating drum (40) is shown in FIG. 2. Where a plow is used, a variety of different shapes can be used, such as shown in FIG. 3. Preferably the plow has a linear arm, curved to create a scoop at the end (e.g., a bent angle iron), which will create the hole or pocket in the fertilizer bed. A sharply angled arm (e.g., a straight angle iron) is less preferred, although it too may be used.

In order to achieve a significant reduction in fouling, the plow must dig into the granule bed. The approach angle of the plow with respect to the substrate bed surface may be 5-175.degree., preferably 30-150.degree., more preferably 40-140.degree., and more preferably still 45-145.degree. The approach angle of the plow with respect to the substrate bed surface may be 5-175°, preferably 30-150°, more preferably 40-140°, and more preferably still 45-145°. The optimum approach angle of the plow with respect to the substrate granule bed surface is related to the shape of the plow and can be determined by one of ordinary skill in the art through routine experimentation.

The depth of the plow in the substrate bed may be 5-95% of the substrate bed depth, preferably 10-90%, more preferably 20-80%, and more preferably still 30-70%. The optimum depth is related to the plow shape, approach angle, and loading rate of the drum, and can be determined by one of ordinary skill in the art through routine experimentation.

Figure 4:
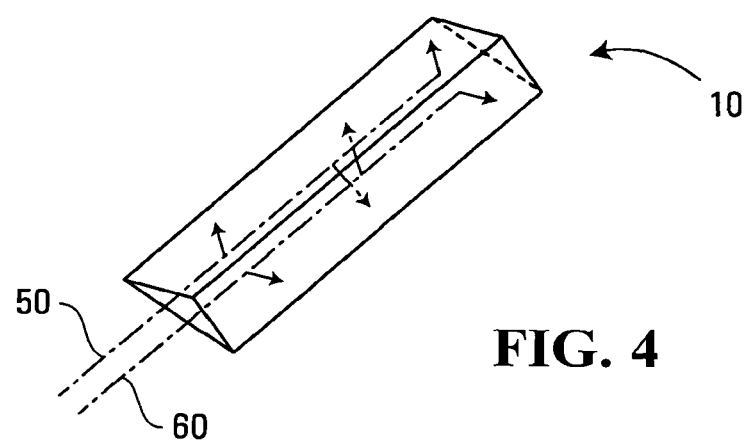
FIG. 4 shows the simultaneous dribbling of polymer coating, premix and/or monomers along the back of a plow to multiple locations onto and/or into a substrate granule bed according to an embodiment of the invention.
Figure 5:
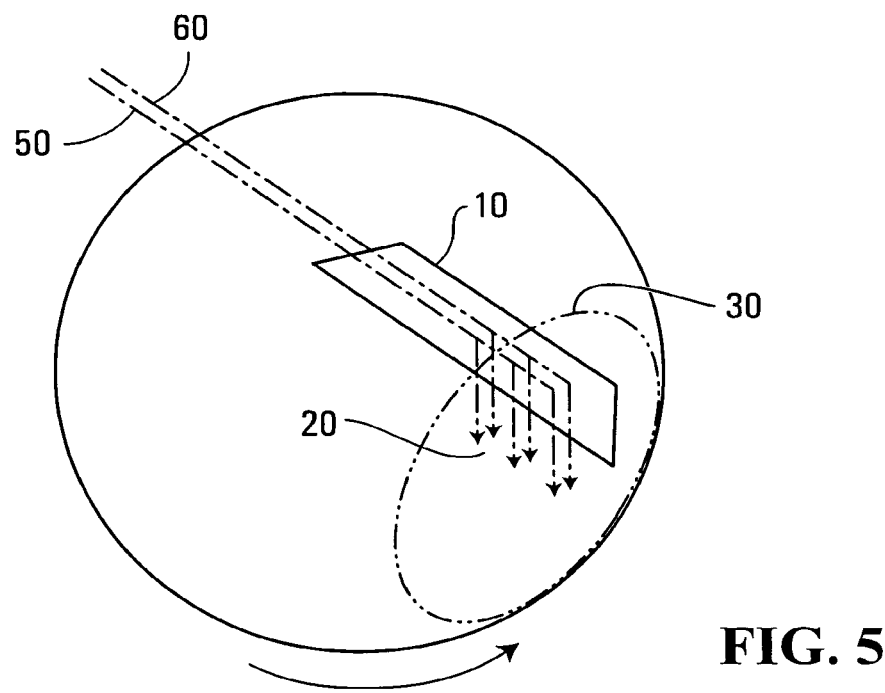
FIG. 5 shows the use of the plow of FIG. 4 to simultaneously delivery polymer coating, premix and/or monomers into a hole or pocket in a granule bed created by the plow.

The coating materials may be delivered substantially simultaneously, as single or divided injections by spraying or dribbling, into the hole or pocket in the substrate granule bed. For instance, for a polyurethane coated fertilizer, (a) premix (comprising a polyol and other coating components) or a polyol, and (b) isocyanate may be delivered into the hole or pocket through the same or different injection nozzles. FIGS. 4 and 5 illustrate the delivery of polymer coating, premix and/or monomers (50, 60) in two injection streams behind the plow (10) into the hole or pocket (20) in the granule bed (30) of the rotating drum (40).

Where castor oil/premix comprising castor oil is used, the castor oil or premix may be delivered into the hole or pocket by dribbling or spraying. Where isocyanate is used, the isocyanate is typically dribbled into the hole or pocket, although it too may be sprayed. Surprisingly good results have been obtained where the castor oil or premix and the isocyanate are dribbled, preferably substantially simultaneously behind the plow.

For significant reduction in fouling, and improved mixing, the first application of coating materials are delivered substantially simultaneously behind the plow. According to one theory for coating fertilizer with polymer, when coating materials are delivered behind the plow, the materials begin mixing in the hole or pocket created such that the higher temperature premix or polyol helps to reduce the viscosity and surface tension of the isocyanate. This in turn increases the penetration speed of the isocyanate into the granule bed. If the coating materials are delivered in front of the plow, the materials are not delivered directly into the hole or pocket and the opportunity for mixing the reactive monomers is reduced. Improved mixing of the coating materials allows for a more even coating to be produced. Improved mixing is particularly important for the first application of coating materials.

The injection nozzles and pipes used to deliver coating materials may be inserted below the surface of the moving granule bed. Where the injection nozzles are below the surface of the granule bed, there is a greater opportunity for mixing of coating components in the hole or pocket. Where the injection nozzles are inserted below the surface of the granule bed, the coating materials are typically dribbled into the hole or pocket.

Figure 6:
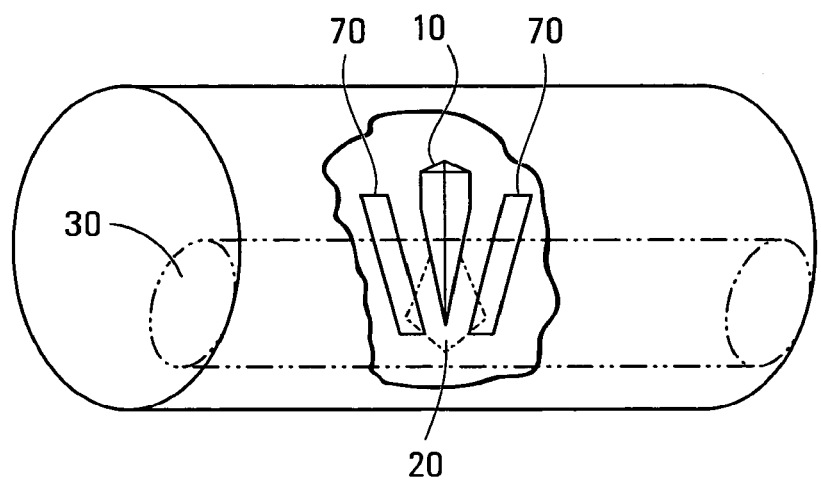
FIG. 6 shows the use of burying devices to bury coating materials in a hole or pocket in a granule bed created by a plow according to an embodiment of the invention.

Burying devices, such as shown in FIG. 6, can also be used to cover the hole or pocket (20) produced by a device such as a plow (10) or high pressure air. A preferred burying device is one or more blades (70). By sealing the cut made by the plow or air with one or more burying devices, mixing may be further improved.

Figure 7:
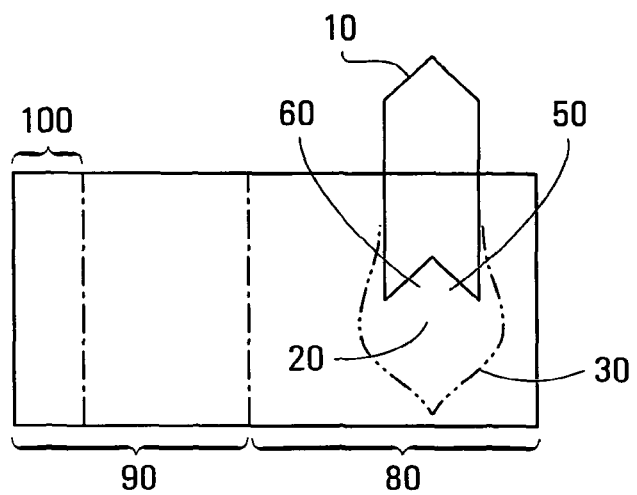
FIG. 7 shows the placement of a plow in the wet zone of a rotating drum and the effect on the dry zone when injection nozzles are placed in front of and behind the plow according to different embodiments of the invention.

When the coating materials are delivered onto or into the granule bed, the materials wet the granules. This wetting of granules creates a "wet zone" (80) in the drum, which is illustrated in FIG. 7. The granules stick together in this zone and move almost as a solid. In the wet zone, it is preferable for the granules to be subjected to a severe or rapid tumbling, mixing or rotating as described in co-pending U.S. patent application Ser. No. 10/868,646.

Coating components can also be delivered into the wet zone at multiple delivery points. If there is multiple delivery of coating components, multiple plows may also be used at each or some, but at least one, of these delivery points.

Once the coating begins to cure (e.g., thermoset polymer) or dry (e.g., thermoplastic polymer), the coated granules enter the "dry zone", in which the granules flow freely in a different flow pattern than when wet.

During the curing or drying phase, coated particles come into contact resulting in granules caking together and defects (such as an uneven coating thickness, craters, tears, pinholes, etc.) forming on the coating surface. To prevent these defects it is preferable to minimize contact between coated particles in the dry zone. In order to do this, the average linear velocity of coated particles in the drum should be reduced. This may be done by reducing drum speed, decreasing drum size, introducing baffles, etc., and as described in co-pending U.S. patent application Ser. No. 10/868,646.

If the drum speed alone is reduced, it is preferably slowed to about 10% to about 80% of the speed of the drum in the wet zone. The same percent reduction also applies to the size of the drum, if it is the size that is reduced.

Figure 8:
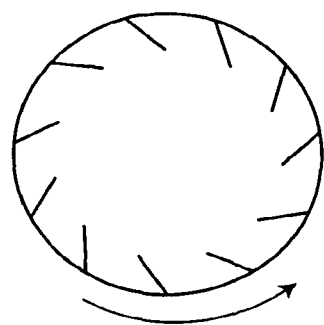
FIG. 8 shows a baffle structure and orientation in the dry zone of FIG. 7 according to an embodiment of the present invention.

Baffles can also be used to reduce the velocity of coated particles, depending on their orientation, height, and number. A preferred baffle orientation is shown in FIG. 8. Preferably the baffles are oriented in a different direction to the avalanche flow of the coated particles (i.e., a direction different than or opposite to the rotational direction of the drum), resulting in a substantial reduction in velocity.

A combination of baffles and reduced drum speed/size can also be used.

It has been surprisingly observed, as illustrated in FIG. 7, that where the coating components in a first coating application are introduced behind the plow in the wet zone, the length of the dry zone increases (90) over that where the components are introduced in front of the plow (100). This translates to a shorter mixing time, and a shorter overall coating process.

A coating unit may be used in which multiple coating layers are applied to substrate granules. For instance, a coating unit having multiple regions for sequential application of coating materials could be used, each region having a wet and dry zone. In the wet zone of the first region, a device to create a hole or pocket, such as a plow, is used. If a plow is used, preferably the coating nozzles and pipes are located behind the plow. In the second and subsequent coating region wet zones a device may also be used to make a hole or pocket, although it is less important than in the first region wet zone. If a plow is used in the second and subsequent wet zones, it has been discovered that it is less important for the coating nozzles and pipes to be located behind the plow in order for there to be a substantial reduction in fouling, although it is preferred to have the nozzles and pipes behind the plow. Preferably a coating unit is used which has three or four coating regions.

The wet and dry zones may comprise the same physical region of the coating drum. The distinction between "zones" in this embodiment is simply a way to describe the stage of the coating process between application of coating materials (wet zone) and stabilization of coating, i.e., curing or drying (dry zone).

In another embodiment, the wet and dry zones comprise two distinct physical regions of the drum. For instance, the drum may be angled, such that substrate granules enter the drum at one end, comprising the wet zone, and move into the dry zone by gravitational force.

The wet and dry zones may also comprise two drums, connected in series.

Where there are multiple coating applications, a single drum may be used or multiple drums may be used. Where multiple drums are used, a variety of drum combinations can be used, including using one or more of the drums or drum combinations described above.

Using a device such as a plow to create a hole or pocket in a granule bed in a first application of coating material to the granules, especially where coating materials are delivered behind the plow if used, results in an improved controlled release product. It has been surprisingly discovered that the product so produced exhibits an improved front-end (i.e., under ten days) water release rate in controlled release profiling tests compared to product produced where (a) no plow is used, and (b) coating components are delivered in front of the plow, if a plow is used.

The following examples are offered by way of illustration and not by way of limitation.

Example 1

A rotary coating unit was used, having three coating regions, with three groups of nozzles and pipes, one group in each coating region.

In the wet zone of the first coating region, a premix (comprising castor oil) and isocyanate were simultaneously delivered through a pipe (i.e., dribbling or spraying) behind a bent angle iron plow that was welded into the coating unit. In the second and third coating regions plows were also used.

It was discovered that the plow helped to reduce the release rate of the product. It was also discovered that by introducing the premix and isocyanate behind the plow, the dry zone of the first coating region increased from about 1 to 1½ feet to approximately 5 feet. This increase in the dry zone is comparable to that of the second and third coating regions, which was not achievable before adding a plow and delivering coating materials behind the plow. This indicates better spreading of the coating materials on the substrate.

By using this method, it was discovered that over a four day period in which the coating unit ran continuously, fouling thickness on the drum wall was reduced by about two-thirds.

Moreover, the controlled release urea (CRU) produced had a 15-20% N release at day 7. This release rate is difficult to achieve both in the absence of a plow and, if a plow is used, with the coating components added in front of the plow in the first wet zone. The improved release rate demonstrates an improved mixing in the first application of coating to substrate.

The % N release of CRU produced according to the above process are shown in Table 1.

TABLE 1

|     | Day 7 | Day 14 | Day 21 |
| --- | --- | --- | --- |
| (a) | 42*  | 55 | 63 |
| (b) | 30   | 45 | 55 |
| (c) | 20   | 28 | 38 |
| (d) | 15   | 22 | 30 |

*% N release
(a) No plow and spraying premix and dribbling isocyanate on the top of the substrate bed surface in the drum. (Control);
(b) with plow and spraying premix and dribbling isocyanate in front of the plow;
(c) with plow and spraying premix and dribbling isocyanate behind the plow; and
(d) with plow and dribbling premix and isocyanate behind the plow.

The data shown in Table 1 indicate that delivering the coating materials into the pocket behind the plow can significantly reduce the nitrogen release rate over that of the Control (a).

The water release data for the controlled release fertilizer material was also determined in accordance with the following procedure.

Water Release Profile Test

A water release rate profile analysis was performed using a Technicon AutoAnalyzer™, calibrated and used pursuant to the teachings of Automated Determination of Urea and Ammoniacal Nitrogen (University of Missouri, 1980). The following procedure was used:

1. Accurately weigh 15 grams (.+−0.0.1 mg) of the sample into a weigh dish. Record the weight of sample. Transfer the sample to 125 mL Erlenmeyer flask.

2. Add 75 mL of demineralized water and stopper the flask.

3. Gently swirl the sample and water until all the particles are submersed.

4. Let the sample stand for a specified time at a constant temperature (typically at room temperature).

5. Gently swirl the flask to mix the solution and decant only the solution to a 100 mL volumetric flask.

6. Rinse the sample with demineralized water adding to the volumetric flask.

7. Bulk to volume of volumetric flask and mix thoroughly.

8. If the test is to be repeated for another time period, repeat starting at Step 2.

9. Once the Technicon AutoAnalyzer II is on line, transfer some of this solution (or perform the required dilutions if necessary) to the Technicon sample cups for analysis.

10. Record the results as parts per million N—NH.sub.3 (read directly from a Shimadzu Integrator).

3. Gently swirl the sample and water until all the particles are submersed.

4. Let the sample stand for a specified time at a constant temperature (typically at room temperature).

5. Gently swirl the flask to mix the solution and decant only the solution to a 100 mL volumetric flask.

6. Rinse the sample with demineralized water adding to the volumetric flask.

7. Bulk to volume of volumetric flask and mix thoroughly.

8. If the test is to be repeated for another time period, repeat starting at Step 2.

9. Once the Technicon AutoAnalyzer II is on line, transfer some of this solution (or perform the required dilutions if necessary) to the Technicon sample cups for analysis.

10. Record the results as parts per million $N—NH_3$ (read directly from a Shimadzu Integrator).

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

All publications, patents and patent applications cited in this specification are incorporated herein by reference as if each individual publication, patent or patent application were specifically and individually indicated to be incorporated by reference. The citation of any publication, patent or patent application is for its disclosure prior to the filing date and should not be construed as an admission that the present invention is not entitled to antedate such publication, patent or patent application by virtue of prior invention.

It must be noted that as used in the specification and the appended claims, the singular forms of "a", "and" "the" include plural reference unless the context clearly indicates otherwise.

Unless defined otherwise all technical and scientific terms used herein have the same meaning as commonly understood to one of ordinary skill and the art to which this invention belongs.

The following is claimed:

1. A process for coating fertilizer granules in a rotating drum, the process comprising:
    rotating a drum containing fertilizer granules to form a granular bed having a first portion and a second portion, the first portion proximate the drum wall and moving in the same rotational direction as the drum, the second portion distal the drum wall and moving in a direction opposite that of the rotational direction of the drum to form a surface of the granular bed;
    moving at least a portion of the second portion of the granular bed relative to a plow inserted into the second portion of the granular bed to form a pocket on a side of the plow and below the surface of the granular bed;
    forming a polyurethane coating on the fertilizer granules by separately delivering a first coating material and a second coating material into the second portion of the granular bed, wherein at least one of the first coating material and the second coating material are delivered directly into the pocket; and
    flowing the coated fertilizer granules over a plurality of baffles oriented in a direction opposite the rotational direction of the rotating drum.

2. The process according to claim 1, wherein the at least one of the first coating material and the second coating material are delivered by spraying directly into the pocket.

3. The process according to claim 1, wherein the at least one of the first coating material and the second coating material are delivered by dribbling directly into the pocket.

4. The process according to claim 1, wherein the first coating material includes a polyol and the second coating material includes an isocyanate.

5. The process according to claim 4, wherein the polyol is castor oil.

6. The process according to claim 1, wherein the first coating material and the second coating material are delivered directly into the pocket.

7. The process according to claim 6, wherein the first coating material and the second coating material are both delivered directly into the pocket by separate injection nozzles.

8. The process according to claim 1, wherein the plow includes a scoop and the pocket is formed on a side of the scoop downstream relative to the movement of the second portion of the granular bed.

9. The process according to claim 8, wherein the plow further includes a linear arm and the scoop is formed by a curvature of the linear arm at an end of the plow.

10. A process for coating fertilizer granules in a rotating drum, the process comprising:
    rotating a drum containing fertilizer granules to form a granular bed having a first portion and a second portion, the first portion proximate the drum wall and moving at least partially in the same rotational direction as the drum, the second portion distal the drum wall and moving a least partially in a direction opposite that of the rotational direction of the drum to form a surface of the granular bed;
    moving at least a portion of the second portion of the granular bed relative to a plow inserted into the second portion of the granular bed to form a pocket below the surface of the granular bed on a side of the plow downstream relative to the movement of the second portion of the granular bed; and
    forming a polyurethane coating on the fertilizer granules by separately delivering a first coating material and a second coating material directly into the pocket.

11. The process according to claim 10, wherein the at least one of the first coating material and the second coating material are delivered by spraying directly into the pocket.

12. The process according to claim 10, wherein at least one of the first coating material and the second coating material are delivered by dribbling directly into the pocket.

13. The process according to claim 10, wherein the first coating material includes a polyol and the second coating material includes an isocyanate.

14. The process according to claim 13, wherein the polyol is castor oil.

15. The process according to claim 10, further including flowing the coated fertilizer granules over a plurality of baffles oriented in a direction opposite the rotational direction of the rotating drum.

16. The process according to claim 10, wherein the first coating material and the second coating material are delivered directly into the pocket by different injection nozzles.

17. The process according to claim 10, wherein the plow includes a scoop.

18. The process according to claim 17, wherein the plow further includes a linear arm and the scoop is formed by a curvature of the linear arm at an end of the plow.

* * * * *